(12) United States Patent
Bungard

(10) Patent No.: US 11,096,373 B2
(45) Date of Patent: Aug. 24, 2021

(54) ANIMAL KENNEL

(71) Applicant: Jackson Kayak, Inc., Sparta, TN (US)

(72) Inventor: Damon Bungard, Spencer, TN (US)

(73) Assignee: JACKSON KAYAK, INC., Sparta, TN (US)

( * ) Notice: Subject to any disclaimer, the term of this patent is extended or adjusted under 35 U.S.C. 154(b) by 325 days.

(21) Appl. No.: 16/051,000

(22) Filed: Jul. 31, 2018

(65) Prior Publication Data

US 2020/0037574 A1 Feb. 6, 2020

(51) Int. Cl.
*A01K 1/02* (2006.01)
*A01K 1/03* (2006.01)

(52) U.S. Cl.
CPC ............ *A01K 1/0245* (2013.01); *A01K 1/034* (2013.01)

(58) Field of Classification Search
CPC ... A01K 1/0245; A01K 1/0254; A01K 1/0236
See application file for complete search history.

(56) References Cited

U.S. PATENT DOCUMENTS

| | | | | |
|---|---|---|---|---|
| 2,538,778 A * | 1/1951 | Halpin | ................. | A01K 1/0245 119/497 |
| 4,977,857 A * | 12/1990 | Slawinski | ............ | A01K 1/0254 119/497 |
| 5,078,096 A * | 1/1992 | Bishop | ................. | A01K 1/0254 119/497 |
| 6,076,485 A * | 6/2000 | Peeples | ................ | A01K 1/0254 119/496 |
| 6,446,577 B1 * | 9/2002 | Salahor | ................ | A01K 1/0254 119/470 |
| 6,619,447 B1 * | 9/2003 | Garcia, III | ........... | A45C 7/0086 150/111 |
| 6,866,009 B2 * | 3/2005 | Smith, Jr. | ............ | A01K 1/0254 119/840 |
| D511,621 S * | 11/2005 | Lindamood | .................. | D14/299 |
| 7,523,719 B2 * | 4/2009 | Miller | .................. | A01K 1/0254 119/496 |
| 7,802,540 B2 * | 9/2010 | Jakubowski | ......... | A01K 1/0254 119/499 |
| 9,635,831 B2 * | 5/2017 | Northrop | ............. | A01K 1/0254 |
| D822,912 S | 7/2018 | Edmonds | | |
| D833,085 S | 11/2018 | Edmonds | | |
| 2003/0127059 A1 * | 7/2003 | Smith, Jr. | ............ | A01K 1/0254 119/496 |
| 2015/0034018 A1 * | 2/2015 | Edmonds | ............. | A01K 1/0245 119/496 |

* cited by examiner

*Primary Examiner* — Monica L Barlow
(74) *Attorney, Agent, or Firm* — Alleman Hall Creasman & Tuttle LLP

(57) ABSTRACT

Examples are disclosed that relate to an animal kennel having a door secured to a body of the animal kennel by a plurality of releasable fasteners. One example provides an animal kennel comprising a body defining an enclosed space and an opening into the enclosed space, a door configured to selectively block the opening, and a plurality of releasable fasteners securing the door to the body, the plurality of releasable fasteners positioned such that the door is selectively openable in a vertical direction or in a horizontal direction based upon different combinations of releasable fasteners being released.

9 Claims, 4 Drawing Sheets

ANIMAL KENNEL

BACKGROUND

Animal kennels may take a variety of different forms, but generally include a body defining an enclosed space, an opening for animal entry and exit, and a door configured to selectively block the opening.

SUMMARY

One example provides an animal kennel comprising a body defining an enclosed space and an opening into the enclosed space, a door configured to selectively block the opening, and a plurality of releasable fasteners securing the door to the body, the plurality of releasable fasteners positioned such that the door is selectively openable in a vertical direction or in a horizontal direction based upon different combinations of releasable fasteners being released.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Examples are disclosed that relate to an animal kennel having a door that can be selectively opened in both a vertical direction and a horizontal direction. Briefly, the disclosed examples utilize a plurality of releasable fasteners to secure the door to the body of the animal kennel. The plurality of releasable fasteners may be positioned such that the door is selectively openable in the vertical direction or horizontal direction based upon different combinations of releasable fasteners being released. Further, when opened vertically, the door may be configured to function as an awning.

Figure 1:
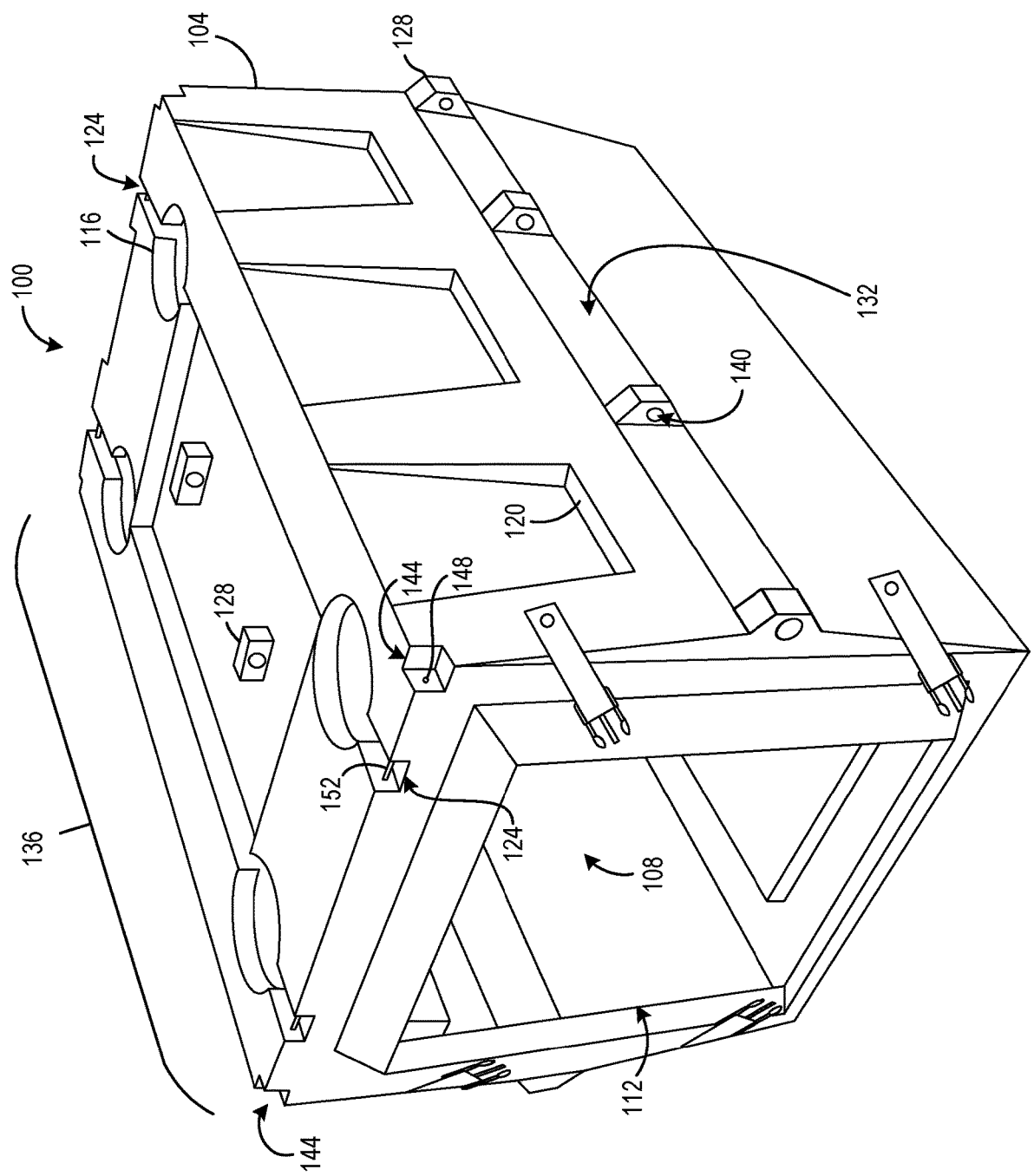
FIG. 1 shows an example of an animal kennel having a body defining an enclosed space and an opening, with the door and handles removed.

FIG. 1 schematically illustrates an example of an animal kennel 100 comprising a body 104. A door, handles, and other features configured to be attached to the body 104 are omitted in FIG. 1. The body 104 defines an enclosed space 108 configured to accommodate an animal, and may comprise various molded features. For example, the body may comprise cup holders 116 and/or ribs 120 configured to support the body 104 against loads or other forces. The body 104 further may comprise channels 124 connected to the cup holders 116 to allow for drainage of condensation, spills, etc. on top of the animal kennel 100.

The body 104 may additionally comprise one or more molded attachment features 128, depicted here as protrusions 128 molded into the body 104 along a midline portion 132 of the body 104 and on a top portion 136 of the body 104 through which a rope, webbing, wire, or other complementary attachment structure may be threaded to attach features such as handles or security devices (e.g. a cable to lock a kennel to another structure) to the animal kennel 100.

In some examples, the animal kennel 100 may comprise one or more indentations 144 on one or more outer corners of the body 104. The one or more indentations 144 may serve as a recessed drill point in which a hole 148 may be formed through at least a portion of the body 104. A pin 152 or other attachment hardware may be inserted through the hole 148. It will be appreciated that the pin 152 or other attachment hardware may be attached to the animal kennel 100 in any other suitable manner, including via insert molding.

As illustrated in FIG. 1, the pin 152 may extend through one or more of the channels 124. In this example, the exposed pin 152 in the channel 124 may serve as an attachment point for handles or security devices, as described above, or for other accessories. For example, the pin 152 may serve as a clipping point for attaching a storage bag to the animal kennel 100.

Figure 2:
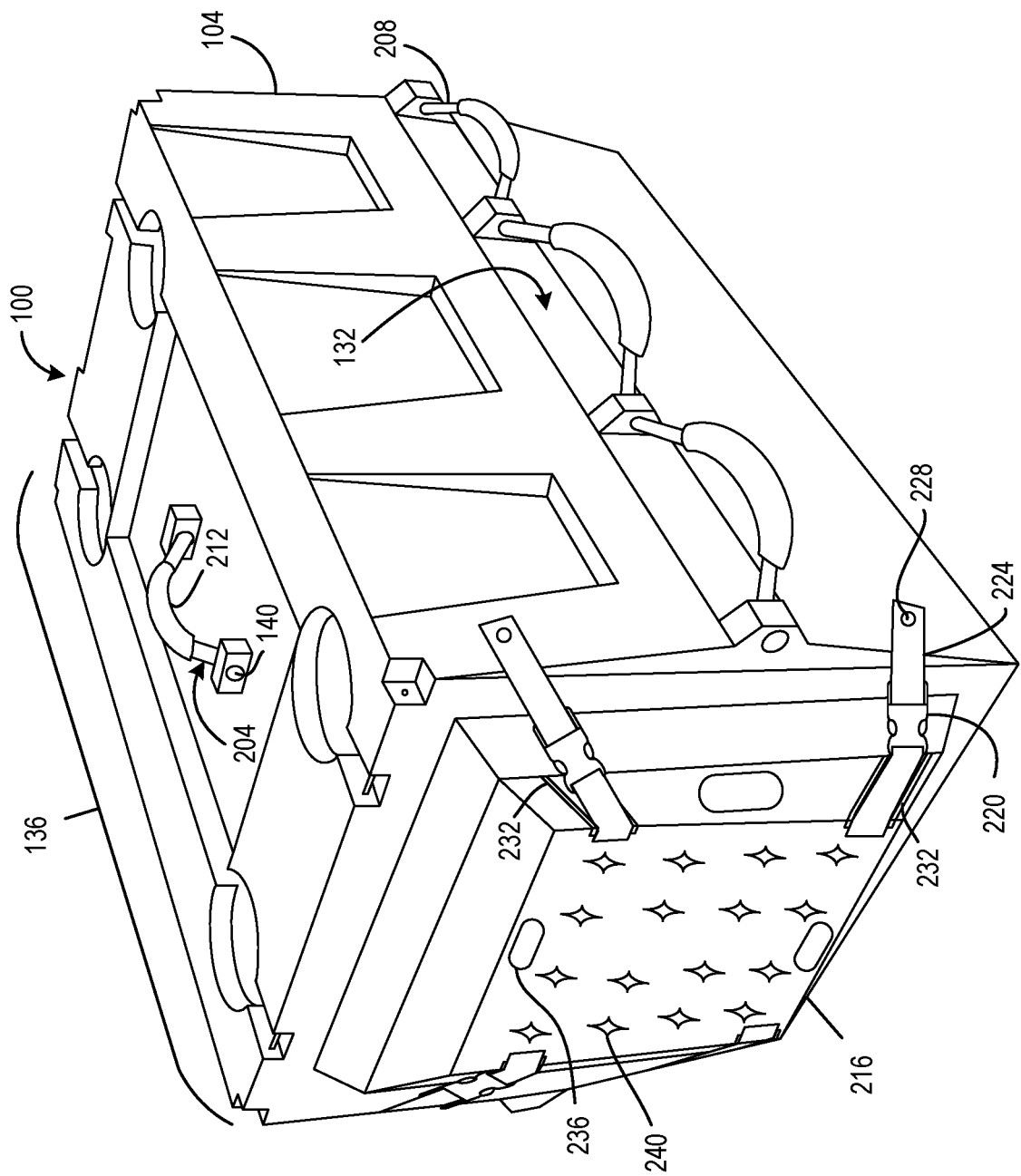
FIG. 2 shows the kennel of FIG. 1 with an example door and a plurality of handles attached.

FIG. 2 illustrates the body 104 with a plurality of handles 204 affixed to the molded protrusions 128. In this example, handles are affixed to the midline portion 132 of the body 104 and to the top portion 136 of the body 104, but may be attached in any other suitable locations in other examples. Each handle comprises a cord 208 running through and fixed to openings 140 of adjacent molded protrusions 128. The one or more handles 204 may also serve as additional anchor points to secure the animal kennel 100 to other objects.

In the example of FIG. 2, each handle 204 comprises a sheath 212, for example, made from a comfortable material to grip. In other examples, each handle may omit a sheath, or may include a sheath having a different configuration from those shown (e.g. having molded finger grips).

FIG. 2 further shows a door 216 secured to the body 104 to selectively block the opening 112. In some examples, such as those illustrated herein, the door 216 may be a separate component configured to be removable from the body 104. In FIG. 2, the door 216 is secured to the body 104 via a plurality of releasable fasteners 220. The releasable fasteners 220 may comprise any suitable releasable structures, such as quick-release buckles. Each of the releasable fasteners 220 may be secured to the body 104 and the door 216 via a length of webbing 224 or other suitable material. The webbing 224 may be bolted or riveted to the body 104 and door 216 at an attachment point 228, or may be attached using any other suitable method.

With reference again to FIG. 2, the door 216 or the body 104 may comprise molded guide features 232 each configured to accommodate a corresponding releasable fastener 220 and/or webbing 224 when buckled and tightened. The door 216 may also comprise one or more molded handles 236, which may take the form of holes or openings through the door 216. The door 216 further may comprise a plurality of air holes 240 to allow fresh air into the animal kennel 100.

The releasable fasteners 220 are positioned such that the door 216 is selectively openable in either horizontal direction or either vertical direction by releasing different combinations of the releasable fasteners 220. In the depicted example, the door 216 comprises a rectangular shape, and a releasable fastener is positioned adjacent to each corner. In other examples, the door 216 may comprise a variety of other shapes and dimensions. For example, the door 216 may have an elongated rectangular, circular, or triangular shape. Accordingly, the plurality of releasable fasteners 220 may be arranged in any suitable manner such that the door 216 may be selectively opened in different directions based upon releasing different combinations of the releasable fasteners 220.

Continuing with FIG. 2, a first pair of releasable fasteners 220 is positioned on one side of the door 216, and a second pair of releasable fasteners 220 is positioned on another side of the door 216. While shown being positioned on opposing horizontal sides of the door 216 the pairs of fasteners also may be positioned on opposing vertical sides of the door, or in any other suitable relation to the door.

Figure 3:
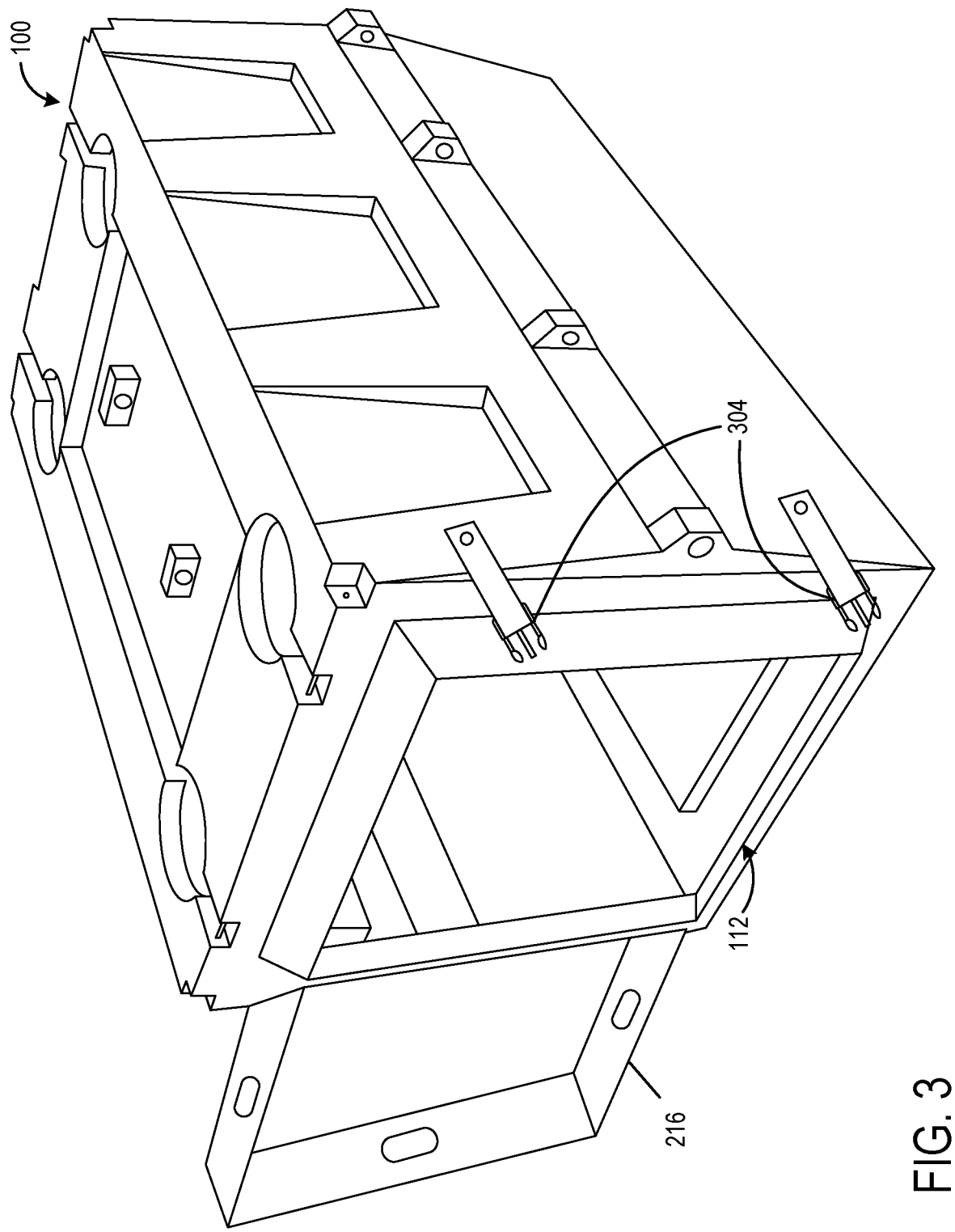
FIG. 3 shows the kennel of FIGS. 1 and 2 with the door opened in a horizontal direction.

FIG. 3 illustrates the door 216 in a horizontally opened configuration. In this configuration, a first pair 304 of releasable fasteners 220 on one side of the opening 112 is released. A second pair of releasable fasteners 220, not shown, on an opposing side of the opening 112 behind the door 216, is not released. Accordingly, the door 216 may hinge about the second pair of releasable fasteners 220. In a similar manner, the second pair of releasable fasteners 220 may be released and the first pair 304 of releasable fasteners 220 may remain fastened such that the door may open in a horizontal direction opposite that illustrated in FIG. 3.

Figure 4:
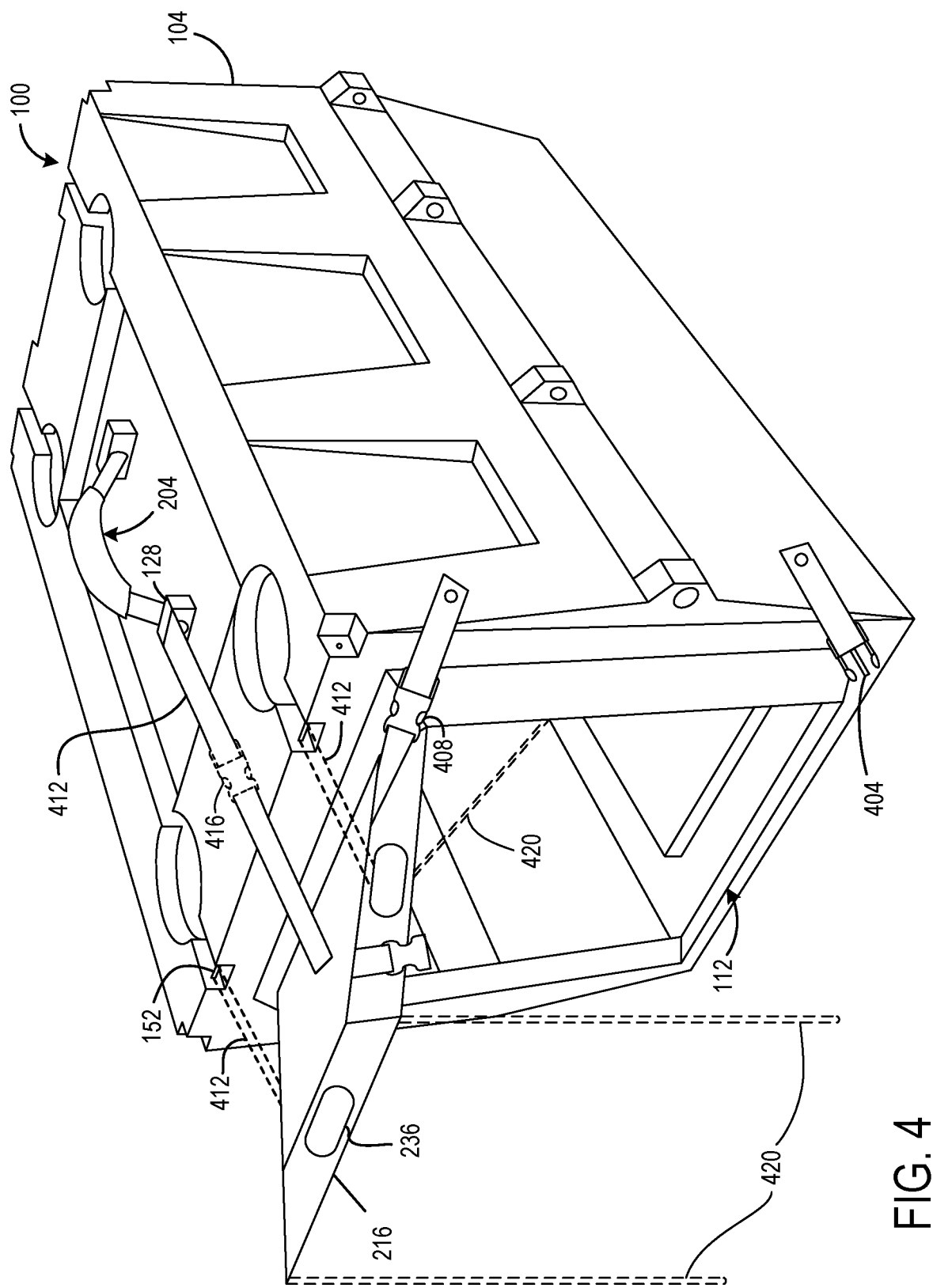
FIG. 4 shows the kennel of FIGS. 1 and 2 with the door opened in a vertical direction.

The door 216 may also be configured to open in a vertical direction. For example, as illustrated in FIG. 4, a lower fastener 404 or a plurality of lower fasteners may be released to allow the door to open vertically by hinging about an upper fastener 408. The upper fastener 408 may be an upper member of a pair of releasable fasteners 220 on a vertical side of the opening 112. Likewise, the lower fastener 404 may be a lower member of the pair of releasable fasteners on the vertical side of the opening 112.

In some examples, as illustrated in FIG. 4, the door the animal kennel 100 may also comprise one or more anchor (s) 412 configured to secure the door 216 in a vertically-open position to function as an awning. In the example of FIG. 4, each of the one or more anchor (s) 412 comprises a length of webbing, cord, rope or other suitable structure releasably secured to the door 216 and the body 104 of the animal kennel 100. For example, one anchor 412 may be secured to the body 104 via a strap connecting one of the molded protrusions 128, handles 204 or pins 152, and the door 216 via one or more of the handles 236 or air holes 240.

In some examples, a releasable fastener 416 may be provided to allow the door to be releasably suspended in an awning configuration. Further, in other examples, the door may be held suspended in an awning configuration by other mechanisms, such as one or more rigid supports 420 that support an underside of the door against the ground or against a portion of the kennel body.

It will be appreciated that the anchor 412 may have any suitable structure or configuration to secure the door 216 in the vertically-open position. For example, the anchor 412 may comprise a rope, a chain, a latch or other hardware. Other suitable structures or configurations may include, but are not limited to, securing the anchor 412 to other portions of the animal kennel 100, or securing the anchor 412 to at least a portion of the body using bolts, rivets, or releasable fasteners.

Another example provides an animal kennel, comprising a body defining an enclosed space and an opening into the enclosed space, a door configured to selectively block the opening, and a plurality of releasable fasteners securing the door to the body, the plurality of releasable fasteners positioned such that the door is selectively openable in a vertical direction or in a horizontal direction based upon different combinations of releasable fasteners being released. The animal kennel may additionally or alternatively include a plurality of molded protrusions, each comprising an opening. The animal kennel may additionally or alternatively include one or more handles affixed to one or more of the plurality of molded protrusions. The plurality of releasable fasteners may additionally or alternatively include one or more quick-release buckles. The plurality of releasable fasteners may additionally or alternatively include a first pair of releasable fasteners on one side of the door and a second pair of releasable fasteners on another side of the door. The door may additionally or alternatively be configured to open horizontally by release of either the first pair of releasable fasteners or the second pair of releasable fasteners. The door may additionally or alternatively be configured to open vertically by release of a lower fastener. The animal kennel may additionally or alternatively include an anchor to secure the door in a vertically-open position.

Another example provides an animal kennel comprising a body defining an enclosed space and an opening into the enclosed space, a door configured to selectively block the opening, and a plurality of releasable fasteners securing the door to the body, the plurality of releasable fasteners comprising a first pair of releasable fasteners on one side of the door and a second pair of releasable fasteners on another side of the door, and the plurality of releasable fasteners positioned such that the door is selectively openable in a vertical direction or in a horizontal direction based upon different combinations of releasable fasteners being released. The animal kennel may additionally or alternatively include a plurality of molded protrusions, each comprising an opening. The animal kennel may additionally or alternatively include one or more handles affixed to one or more of the plurality of molded protrusions. The plurality of releasable fasteners may additionally or alternatively include one or more quick-release buckles. The door may additionally or alternatively be configured to open horizontally by release of either the first pair of releasable fasteners or the second pair of releasable fasteners. The door may additionally or alternatively be configured to open vertically by release of a lower fastener.

Another example provides an animal kennel comprising a body defining an enclosed space and an opening into the enclosed space, a door configured to selectively block the opening, a plurality of releasable fasteners securing the door to the body, the plurality of releasable fasteners positioned such that the door is selectively openable in a vertical direction or in a horizontal direction based upon different combinations of releasable fasteners being released, and a plurality of molded protrusions, each comprising an opening. The animal kennel may additionally or alternatively include one or more handles affixed to one or more of the plurality of molded protrusions. The plurality of releasable fasteners may additionally or alternatively include one or more quick-release buckles. The plurality of releasable fasteners may additionally or alternatively include a first pair of releasable fasteners on one side of the door and a second pair of releasable fasteners on another side of the door. The door may additionally or alternatively be configured to open horizontally by release of either the first pair of releasable fasteners or the second pair of releasable fasteners. The door may additionally or alternatively be configured to open vertically by release of a lower fastener.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An animal kennel, comprising:
a body defining an enclosed space and an opening into the enclosed space;
a door configured to selectively block the opening; and
a plurality of releasable fasteners securing the door to the body,
the plurality of releasable fasteners positioned such that the door is selectively openable in a vertical direction or in a horizontal direction based upon different combinations of releasable fasteners being released;
wherein the plurality of releasable fasteners comprises a first pair of releasable fasteners on one side of the door and a second pair of releasable fasteners on another side of the door;
wherein the door is configured to open in the horizontal direction by release of either the first pair or the second pair of releasable fasteners while the other of the first pair or the second pair of releasable fasteners secure the door to the body;
wherein the door is configured to open in the vertical direction by release of a lower fastener of each of the first pair and the second pair of releasable fasteners while an upper fastener of each of the first pair and the second pair of releasable fasteners secure the door to the body.

2. The animal kennel of claim 1, further comprising a plurality of molded protrusions, each comprising an opening.

3. The animal kennel of claim 2, further comprising one or more handles affixed to one or more of the plurality of molded protrusions.

4. The animal kennel of claim 1, wherein the plurality of releasable fasteners comprises one or more quick-release buckles.

5. The animal kennel of claim 1, further comprising one or more rigid supports to suspend the door in open position while opened in the vertical direction relative to a ground surface.

6. An animal kennel comprising:
a molded body defining an enclosed space and an opening into the enclosed space;
a molded door configured to selectively block the opening;
a plurality of releasable fasteners securing the door to the body,
the plurality of releasable fasteners comprising a first pair of releasable fasteners on one side of the door and a second pair of releasable fasteners on another side of the door, and
the plurality of releasable fasteners positioned such that the door is selectively openable in a vertical direction or in a horizontal direction based upon different combinations of releasable fasteners being released; and
one or more anchors configured to secure the door to the body in an open position while opened in the vertical direction to function as a rigid awning;
wherein the door is configured to open in the horizontal direction by release of either the first pair or the second pair of releasable fasteners while the other of the first pair or the second pair of releasable fasteners secure the door to the body;
wherein the door is configured to open in the vertical direction by release of a lower fastener of each of the first pair and the second pair of releasable fasteners while an upper fastener of each of the first pair and the second pair of releasable fasteners secure the door to the body.

7. The animal kennel of claim 6, further comprising a plurality of molded protrusions, each comprising an opening.

8. The animal kennel of claim 7, further comprising one or more handles affixed to one or more of the plurality of molded protrusions.

9. The animal kennel of claim 6, wherein the plurality of releasable fasteners comprises one or more quick-release buckles.

* * * * *